Nov. 19, 1963 I. M. WYMAN ET AL 3,111,224
INFORMATION HANDLING APPARATUS
Filed April 17, 1961
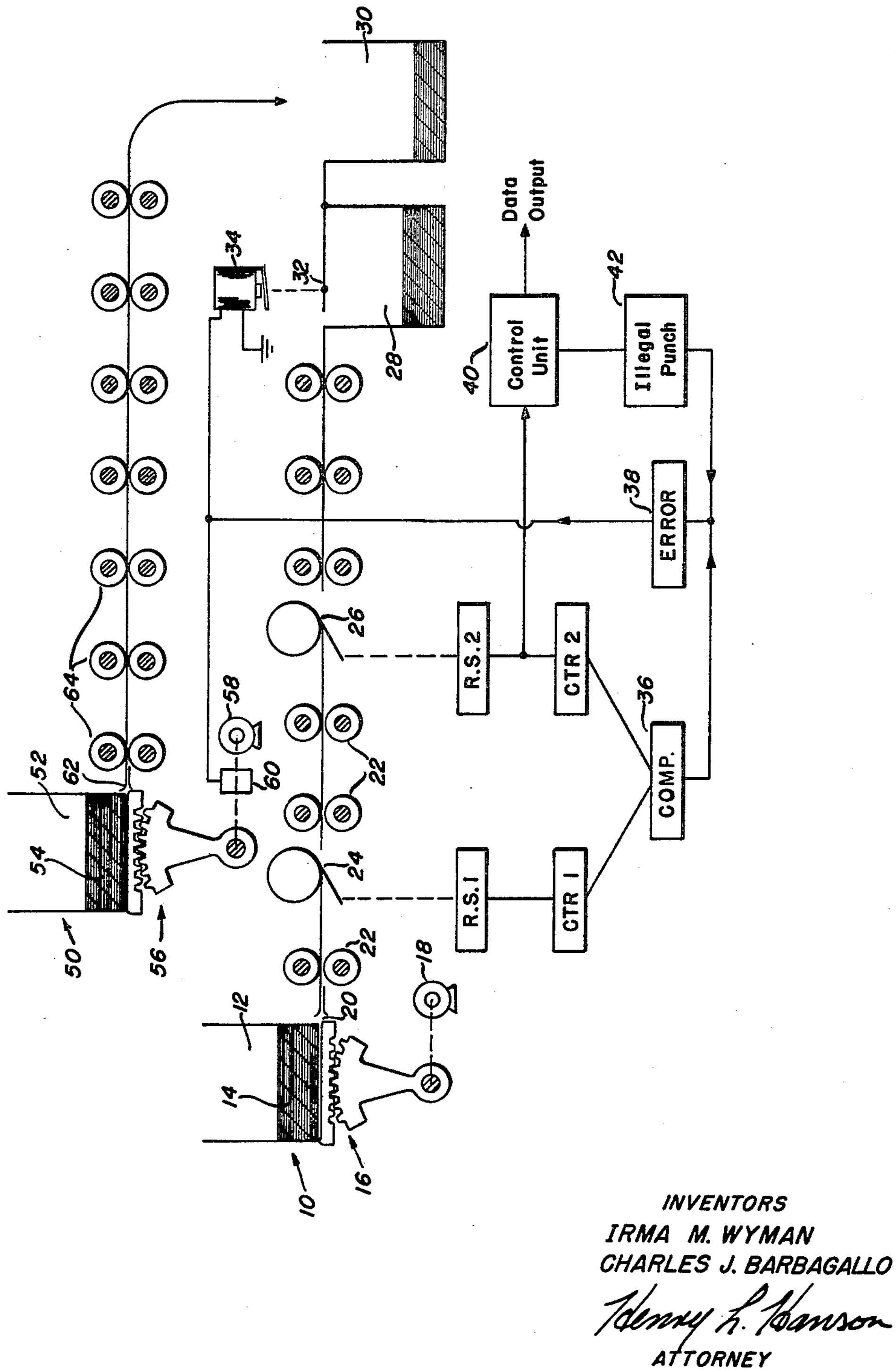
INVENTORS
IRMA M. WYMAN
CHARLES J. BARBAGALLO
Henry L. Hanson
ATTORNEY

United States Patent Office 3,111,224
Patented Nov. 19, 1963

3,111,224

INFORMATION HANDLING APPARATUS

Irma M. Wyman, Peterborough, N.H., and Charles J. Barbagallo, Needham, Mass., assignors to Minneapolis-Honeywell Regulator Company, Minneapolis, Minn., a corporation of Delaware Filed Apr. 17, 1961, Ser. No. 103,483
2 Claims. (Cl. 209—110)

A general object of the present invention is to provide a new and improved apparatus for handling information-bearing documents. More specifically, the present invention is concerned with a document-reading apparatus which is characterized by the apparatus incorporating facilities for locating and characteristically identifying the presence of an error in one of a plurality of documents which have been read.

In many data processing systems, the input to this system takes the form of an information-bearing document. The type of document which has received wide use is the punched card which is arranged to have holes punched therethrough in accordance with a predetermined code, sometimes referred to as the Hollerith code, for purposes of identifying data which is to be utilized in the data processing system. In addition to punched cards, data may well be read from other types of information-bearing documents having codes marked thereon or characters formed thereon such that they can be read by electro-mechanical means. For a document feeder to be useful with a data processing system, the feeder must be capable of handling large quantities of documents at high rates of speed in order that the data processing system with which the document reader is associated not be unduly held up in its operation waiting for incoming information.

As incoming documents may well have errors associated therewith either as a result of the manual manipulation to which they have been subjected, or as the result of an electro-mechanical failure in the document-reading equipment, it is essential that the errors that have occured not pass undetected. Consequently, error sensing means have been provided to protect against the various types of errors that may occur in the document handling process. In a high-speed document reader it is generally inconvenient and expensive to stop a document-reading operation upon the occurrence of each detected error. It is far better that the documents of a batch being read be transferred on into the data processing system and that an appropriate identification operation be taken with respect to any document with which an error is associated.

It is therefore a further object of the present invention to provide a new and improved document-handling apparatus wherein means are provided for characteristically identifying the location of an error in one of a plurality of documents that are being handled without requiring that the document-handling operation be stopped.

In a preferred form of the invention, a pair of document-feeding stations are provided, one of which is associated with documents of the information-bearing type which are adapted to be read and have the data therein transferred to some utilization circuit, such as a data processing system. The second feeding station is associated with a document which may be referred to as a marker document. In normal operation, cards or documents are fed from the first feeding station to an output storage means past a suitable data sensing element. Error sensing means may be associated with the sensing element and, upon the occurrence of an error, or a non-acceptable data combination, a document from the second feeding station may be transferred into the space wherein the document in error is located to facilitate subsequent error location and analysis of the documents.

It is therefore a further object of the present invention to provide a new and improved apparatus for reading information with respect to a plurality of documents wherein a pair of document-feeding stations are provided, one of which serves to transfer documents having data to be read and the other of which serves to transfer a marker document to identify the location of an error which has been sensed with respect to the document which was read.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Referring to the single figure, there is here shown a document feeder which is arranged to transfer documents from an input hopper to an output hopper by way of reading stations in combination with a further document feeder which is adapted to feed marker documents in accordance with the presence of an error condition. Considering the drawing more specifically, numeral 10 identifies a document-feeding station which includes a hopper 12 having a plurality or stack of data-bearing documents 14 positioned therein. The feeding mechanism illustrated is by way of example only and is assumed to be a picker-knife assembly 16 which is arranged to be driven in a well known manner by a suitable drive motor 18.

A document picked from the stack 14 is arranged to be fed through an appropriate throat 20 to feed rollers 22 so that the document will pass by an appropriate document-reading station 24. The reading station in the apparatus described is assumed to be a hole-reading station useful for reading holes in a punched card. After a document has passed the reading station 24, it is moved on by the further feed rollers 22 and it will pass a second reading station 26 where the information on the document will again be read. The card will then continue to pass by way of appropriate feed rollers to one or the other of two output hoppers 28 or 30. The hopper 30 is assumed to be the hopper where the documents properly read, and without error, will be stacked, while the hopper 28 is assumed to be a reject hopper for storing documents having an error condition associated therewith. The input to the hopper 28 is by way of a control vane 32 which is normally depressed such that a document passing along to the feed rollers 22 will pass over the hopper 28 into the hopper 30. The controlling of the vanes 32 may be by way of solenoid 34 receiving an actuating signal from an appropriate electronic circuit which indicates that an unwanted or error condition exists with respect to the particular document which has been read at the reading stations 24 and 26.

The control signals for operating the solenoid 34 may be derived in numerous ways in accordance with the desired checking which is to be performed in the course of the reading of the documents. A typical form of check performed in a document reader having two reading stations is a hole count check. Thus, as a punched-card document is passed through the reading station 24, the holes in the document will be sensed by way of a read sense circuit RS1 with the output thereof being passed to a counter CTR1. The counter may function in any desired modulus or may even serve to count as an absolute number the total number of holes punched in the document being read. After the document has passed the reading station 24 it will reach the station 26 where it will once again be read and the read sense circuit RS2 will produce signals to be fed to a second counter CTR2. The output from the counter CTR1, suitably delayed by means not shown, is adapted to be compared with the output from the counter CTR2 in a comparison circuit 36 and, upon the lack of an agreement between the outputs of the two counters, a signal will be transferred to a suitable error circuit 38 which is adapted to supply a signal to the solenoid 34.

The output signals from the reading sense circuit RS2 will, in the course of a normal data processing circuit, have the code in the card converted into an appropriate output code usable in a data processing system. For this purpose, a control unit 40 may be provided for converting the Hollerith code, for example, to a 6-bit alpha-numeric code so that the 6-bit code may be transferred to an appropriate data output. By definition, certain codes which are read from the card may be identified as illegal codes or illegal punches. What is an illegal code will, of course, be dependent upon the intended use of the code being manipulated. If an illegal code is detected, an illegal punch or code circuit 42 may be utilized to transfer a signal to the error circuit 38 so that the solenoid 32 will receive an appropriate energizing signal.

The apparatus also includes a marker document feeding apparatus 50 having an appropriate input document hopper 52 which is adapted to contain a stack of marker documents 54. A picker-knife assembly is shown as the feeding mechanism, the latter being driven by way of a motor 58 which is adapted to be selectively clutched to the picker assembly 56 by way of a clutch mechanism 60. The document picked from the stack 54 in the hopper 52 is arranged to be fed through a throat 62 to a series of transfer rollers 64 and then to the output hopper 30.

In order to better understand the nature of the invention, the over-all operation thereof should be considered. At the start of the operation, an operator will place in the input hopper 12 the documents which are to be read. The operator will also place in the input hopper 52 a suitable deck or stack of marker documents 54. For ease of identification, the marker documents 54 may well be of a color different than the documents in the stack 14. After the input hoppers have been appropriately loaded, the operator will put the apparatus into operation, by means not shown, so that cards or documents will be fed from the stack 14 to the reading stations 24 and 26. By the time a document has left the reading station 26, the electronic circuitry associated therewith for producing the count of the holes as well as the conversion of the code will have been operative so that appropriate control action can be taken, if necesary, before the card reaches the output hoppers 28 and 30. It is assumed that the first document read is read without error and, consequently, this document will pass over the top of the hopper 28 into the output hopper 30. This will be the path taken by all of the documents which are read without error, or do not have an unwanted condition associated therewith as might be indicated by way of an illegal code.

It is next assumed that a card or document is fed from the stack 14 past the first reading station 24 and to the second reading station 26 with the hole count produced at the two reading stations 24 and 26 being different. With the counters CTR1 and CTR2 having a different output, the comparison circuit will indicate an error condition exists and, consequently, a signal will be fed from this comparison circuit 36 into the error circuit 38. The output from the error circuit 38 will supply an energizing signal to the solenoid 34 such that the control vane 32 at the input of the hopper 28 will be moved to an active position. The document passing out of the station 26 will then be fed into the hopper 28. In addition, the signal from the error circuit 38 is coupled to the clutch mechanism 60 to activate the clutch and thereby cause the drive motor 58 to activate the picker mechanism 56 and pick a marker document from the stack 54. This marker document will pass to the throat 62, to the feed rollers 64 and thence into the output hopper 30 so that its position in the output hopper will be at the location which would normally be occupied by the document which was found to contain an unwanted error.

After the document in error and the marker documents have been placed into the hoppers 28 and 30 respectively, the apparatus will return to normal condition to initiate the feeding of the next document from the stack 14. The returning of the apparatus to normal following a card feed will require a resetting of the counters CTR1 and CTR2. Resettable counters suitable for use in the present apparatus are well-known in the art. A representative counter may be found in the patent issued to G. F. Ziffer, bearing No. 2,825,805, issued March 4, 1958. The ultimate output location of the next document will, of course, be dependent upon the presence or absence of an indicated error condition in this document.

It will be readily apparent to those skilled in the art that the principles of the invention may be implemented in many different ways. Thus, in a document feeder having a single output hopper, marker documents can be fed into this hopper either before or after a document found to contain an error in order to uniquely identify the location of the document containing the error. Further, other means may be provided for characteristically identifying a card to be in error and the location thereof by appropriate die-spraying mechanism which may be operated by the solenoid 34.

While, in accordance with the provisions of the statutes, there has been illustrated and described the best form of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. Apparatus for reading punched cards comprising a first input card hopper, a second input card hopper, card feeding means connected to said first and second hoppers, first and second card reading means positioned to read in sequence the cards fed from said first input hopper, a first output hopper adapted to receive all cards read without error, a second output hopper adapted to receive any rejected card, first counter means connected to said first card reading means to count all of the holes read in each card from said first hopper as it moves past said first reading means, second counter means connected to said second card reading means to count all of the holes read in each card from said first hopper as it moves past said second reading means, error sensing means comprising comparison means connected to the outputs of said first and second counters, said comparison means producing an error signal in the event that the count of said first and second counters are not the same following each card read, and means including said error sensing means, when said error signal is produced, connected to said card feeding means to activate said card feeding means to feed a card from said second input hopper into said first output hopper and to direct the card associated with the error signal into said second output hopper.

2. Apparatus for reading punched cards comprising a first input card hopper, a second input card hopper, card feeding means connected to said first and second hoppers, first and second card reading means positioned to read in sequence the cards fed from said first input hopper, a first output hopper adapted to receive all cards read without a detected error, a second output hopper adapted to receive any rejected card, first counter means connected to said first card reading means to count all of the holes read in each card from said first hopper as it moves past said first reading means, second counter means connected to said second card reading means to count all of the holes read in each card from said first hopper as it moves past said second reading means, first error sensing means comprising comparison means connected to the outputs of said first and second counters, said comparison means producing an error signal in the event that the count of said first and second counters are not the same following each card read, second error sensing means comprising means sensing illegal combinations of punches in each card read and producing an error signal for each such illegal combination sensed, and error signal responsive means connected to said first and second error sensing means and to said card feeding means to activate said card feeding means upon the occurrence of an error signal to feed a card from said second input hopper into said first output hopper and to direct the card associated with the error signal into said second output hopper.

References Cited in the file of this patent

UNITED STATES PATENTS

| | | |
|---|---|---|
| 1,481,507 | Einstein | Jan. 22, 1924 |
| 2,624,273 | Wheeler | Jan. 6, 1953 |
| 3,024,980 | Droege et al. | Mar. 13, 1962 |

FOREIGN PATENTS

| | | |
|---|---|---|
| 421,776 | Great Britain | Dec. 31, 1934 |

OTHER REFERENCES

IBM Technical Disclosure Bulletin, vol. 2, No. 4, December 1959, pages 98–100.